United States Patent [19]

Elvin

[11] Patent Number: 5,155,073
[45] Date of Patent: Oct. 13, 1992

[54] DEMETALLIZATION OF HYDROCARBON CONVERSION CATALYSTS

[75] Inventor: Frank J. Elvin, Houston

[73] Assignee: Coastal Catalyst Technology, Inc., Houston, Tex.

[21] Appl. No.: 690,501

[22] Filed: Apr. 24, 1991

[51] Int. Cl.$^5$ .................. B01J 38/56; B01J 38/42; B01J 29/38; C10G 11/05

[52] U.S. Cl. .................. 502/31; 208/52 CT; 208/113; 208/124; 502/30; 502/32; 502/35; 502/50; 502/516

[58] Field of Search .................. 502/34, 35, 50, 31, 502/516, 30; 208/52 CT

[56] References Cited

U.S. PATENT DOCUMENTS

| | | | |
|---|---|---|---|
| 4,243,550 | 1/1981 | Burk et al. .................. | 502/27 |
| 4,432,864 | 2/1984 | Myers et al. .................. | 208/120 |
| 4,541,923 | 9/1985 | Lomas et al. .................. | 208/113 |
| 4,828,684 | 5/1989 | Elvin .................. | 502/516 |
| 4,986,896 | 1/1991 | Avidan et al. .................. | 502/34 |
| 5,021,377 | 6/1991 | Maholland et al. .................. | 208/120 |

*Primary Examiner*—Paul E. Konopka
*Attorney, Agent, or Firm*—Browning, Bushman, Anderson & Brookhart

[57] ABSTRACT

A demetallization process for catalysts used for chemical conversion of hydrocarbons, the catalysts containing at least vanadium as a metal poison, wherein the poisoned catalyst is contacted in a sulfiding zone with a sulfiding agent and a hydrocarbon having a minimum boiling point of about 300° F., the hydrocarbon being at least partially vaporizable at the temperature in the sulfiding zone.

10 Claims, No Drawings

5,155,073

DEMETALLIZATION OF HYDROCARBON CONVERSION CATALYSTS

BACKGROUND OF THE INVENTION

1. Field of the Invention

The present invention relates to a process for the removal of metal poisons from a hydrocarbon conversion catalyst which has been contaminated with one or more poisoning metals by use in a high temperature catalytic conversion of hydrocarbon feedstocks to more valuable, lower boiling products. More particularly, the present invention relates to an improved process of reducing the vanadium content of such catalysts. The invention may be used as part of an overall metals-removal process employing a plurality of processing steps to remove a significant amount of one or more of nickel, vanadium and iron contained in the poisoned catalyst.

2. Description of the Background

Catalytically promoted methods for the chemical conversion of hydrocarbons include cracking, hydrocracking, reforming, hydrodenitrogenation, hydrodesulfurization, etc. Such reactions generally are performed at elevated temperatures, for example about 300° to 1200° F., more often 600° to 1000° F. Feedstocks to these processes comprise normally liquid and solid hydrocarbons which, at the temperature of the conversion reaction, are generally in the fluid, i.e., liquid or vapor state, and the products of the conversion usually are more valuable, lower boiling materials.

In particular, cracking of hydrocarbon feedstocks to produce hydrocarbons of preferred octane rating boiling in the gasoline range is widely practiced and uses a variety of solid inorganic oxide catalysts to give end products of fairly uniform composition. Cracking is ordinarily effected to produce gasoline as the most valuable product and is generally conducted at temperatures of about 750° to 1100° F., preferably about 850° to 950° F., at pressures up to about 2000° psig. and without substantial addition of free hydrogen to the system. In cracking, the feedstock is usually a petroleum hydrocarbon fraction such as straight run or recycle gas oils or other normally liquid hydrocarbons boiling above the gasoline range. Recently, low severity cracking conditions have been employed for heavily contaminated feedstocks such as crude or reduce crude where the conversion is not made directly to the most valuable, lower boiling products, i.e. gasoline boiling range products, but to intermediate type hydrocarbon conversion products which may be later refined to the more desirable, lower boiling, gasoline or fuel oil fractions. High severity cracking has also been practiced for the conversion of such feedstocks to light, normally gaseous hydrocarbons, such as ethane, propane or butane.

The present invention relates to the improvement of catalyst performance in hydrocarbon conversion where metal poisoning occurs. Although referred to as "metals", these catalystic contaminants may be present in the hydrocarbon feed in the form of free metals or relatively non-volatile metal compounds. It is, therefore, to be understood that the term "metal" as used herein refers to either form. Various petroleum stocks have been known to contain at least traces of many metals. For example, Middle Eastern crudes contain relatively high amounts of several metal components, while Venezuelan crudes are noteworthy for their vanadium content and are relatively low in other contaminating metals such as nickel. In addition to metals naturally present in petroleum stocks, including some iron, petroleum stocks also have a tendency to pick up tramp iron from transportation, storage and processing equipment. Most of these metals, when present in a stock, deposit in a relatively non-volatile form on the catalyst during the conversion processes so that regeneration of the catalyst to remove deposited coke does not also remove these contaminants. With the increased importance of gasoline in the world today and the shortages of crude oils and increased prices, it is becoming more and more important to process any type or portion of the crude, including the highly metal contaminated crudes to more valuable products.

Typical crudes which are contaminated with metals and some average amounts of metal are: North Slope, 11 ppm nickel, 33 ppm vanadium; Lagomedio (Venezuelan), 12 ppm nickel, 116 ppm vanadium; light Iranian, 16 ppm nickel, 44 ppm vanadium; heavy Iranian, 30 ppm nickel, 22 ppm vanadium. In general, a crude oil can contain from about 5 to 500 ppm nickel and from about 5 to 1500 ppm vanadium. Moreover, since the metals tend to remain behind during processing, the bottoms of typical feeds will have an amount of metals two, three, four times or more than the original crude. For example, reduced crude or residual stocks can have vanadium levels as high as 1000-2000 ppm. Typical residual stocks and their vanadium level include: Sag River atmospheric residuum, 48 ppm vanadium; heavy Iranian atmospheric residuum, 289 ppm vanadium; Canadian tar sand bitumen, 299 ppm vanadium; Ti Juana Vacuum residuum, 570 ppm vanadium; Bachaquero Vacuum residuum, 754 ppm vanadium; and Orinoco Heavy Crude, 1200 ppm vanadium. The higher the metal level in the feed, the more quickly a given catalyst will be poisoned and consequently the more often or more effective the demetallization of that catalyst must be.

Of the various metals which are to be found in representative hydrocarbon feedstocks some, like the alkali metals, only deactivate the catalyst without changing the product distribution; therefore, they might be considered true poisons. Others such as iron, nickel, vanadium and copper markedly alter the selectivity and activity of cracking reactions if allowed to accumulate on the catalyst and, since they affect process performance, are also referred to as "poisons". A poisoned catalyst with these metals generally produces a higher yield of coke and hydrogen at the expense of desired products, such as gasoline and butanes. For instance, U.S. Pat. No. 3,147,228 reports that it has been shown that the yield of butanes, butylenes and gasoline, based on converting 60 volume percent of cracking feed to lighter materials and coke dropped from 58.5 to 49.6 volume percent when the amount of nickel on the catalyst increased from 55 ppm to 645 ppm and the amount of vanadium increased from 145 ppm to 1480 ppm in a fluid catalytic cracking of a feedstock containing some metal contaminated stocks. Since many cracking units are limited by coke burning or gas handling facilities, increased coke or gas yields require a reduction in conversion of throughput to stay within the unit capacity.

An alternative to letting catalyst metals level increase and activity and desired selectivity decrease is to diminish the overall metal content on the catalyst by raising catalyst replacement rates. Either approach, letting metals level increase, or increasing catalyst replacement rates, must be balanced against product value and operating costs to determine the most economic way to operating. The optimum metal level at which to operate any cracking unit will be a function of many factors including feedstock metal content, type and cost of catalyst, overall refinery balance, etc., and can be determined by a comprehensive study of the refinery's operations. With the high cost of both catalyst and the hydrocarbon feedstock today, it is increasingly disadvantageous to discard catalyst or convert hydrocarbon feedstocks to coke or gas.

Many patents have issued discussing various approaches to removing metals from hydrocarbon conversion catalysts and then returning the catalyst to hydrocarbon conversion service. See, for example, U.S. Pat. Nos. 3,150,103; 3,150,104; 3,122,510; 3,173,882; 3,147,228; 3,219,586; 3,182,025; 3,252,918; 4,101,444; 4,163,709; 4,163,710; 4,243,550; and 4,686,197.

As disclosed in U.S. Pat. Nos. 4,686,197, and 4,243,550, both of which are incorporated herein by reference, a typical treatment of a metal poisoned catalyst includes regeneration in which portions of the catalyst are periodically contacted with free oxygen containing gas to removal at least a portion of the carbonaceous deposits, sulfiding in which the regenerated catalyst is contacted with sulfiding agents, e.g. $H_2S$, to convert the metals into metal-sulphur compounds to produce a sulfided catalyst, and chlorination in which the sulfided catalyst is contacted with a chlorine containing compound to convert the metal poisons to metal chlorides which can be removed by volatilization and/or aqueous washing. The catalysts can also be subjected to other processes such as oxidation, reductive washes, oxidative washes, etc., all of which are aimed at effecting some removal of the metal poisons.

Sulfiding of the poisoned catalysts is known to be highly advantageous for nickel removal but less so for the removal of vanadium. For example, it is known that greater than 80 percent of the nickel can be removed using conventional, prior are demetallization processes but the removal of vanadium is significantly less.

SUMMARY OF THE INVENTION

It is therefore an object of the invention to provide an improved process for the demetallization of catalysts used for the chemical conversion of hydrocarbons.

Another object of the present invention is to provide an improved method of removing vanadium metal from catalysts used for chemical conversion of hydrocarbons.

Still another object of the present invention to is to provide an improved method of sulfiding catalysts used for the chemical conversion of hydrocarbons to enhance vanadium removal.

The above and other objects of the present invention will become apparent from the description given herein and the appended claims.

The present invention provides an improvement in the demetallization of catalysts used for the chemical conversion of hydrocarbons wherein a metal contaminated catalyst containing vanadium is subjected to a sulfiding step wherein a sulfiding agent such as $H_2S$ is contacted with the catalyst at elevated temperatures to convert the metal poisons to metal-sulphur compounds and the catalyst to a sulfided catalyst. In the improved process of the present invention, a hydrocarbon having a boiling point of at least about 300° F. and being at least partially vaporizable at the sulfiding temperature is introduced into the sulfiding zone together with the sulfiding agent, the amount of hydrocarbon introduced being sufficient to enhance vanadium removal of the catalyst being treated. The improved process leads to enhanced vanadium removal in subsequent downstream processing of the catalyst. For example, it is common following the sulfiding step to subject the sulfided catalyst to a chlorination step and convert the metal-sulphur compounds to metal chlorides which can be more easily volatilized or removed by various washing techniques well known to those skilled in the art.

DETAILED DESCRIPTION OF PREFERRED EMBODIMENTS

The process of the present invention can be used to demetallize catalysts used for catalytically promoted methods for the chemical conversion of hydrocarbons such as cracking, hydrocracking, reforming, hydroforming, etc. Such reactions generally are performed at elevated temperatures, for example, about 300° to about 1200° F., more often 600° to 1000° F. Feed stocks to these processes comprises normally liquid and solid hydrocarbons which at the temperature of the conversion reaction are generally in the fluid, i.e., liquid or vapor state and the products and the conversion frequently are lower boiling materials.

The catalysts which can be treated according to the process of the present invention may vary widely depending on the use to which the catalyst is put. In general, any catalyst useful in conversion or cracking of hydrocarbons in typical hydrocarbon conversion or cracking conditions can be treated according to the process of the present invention. Typical conventional catalysts which can be treated according to the process of the present invention comprises alumina, silica and/or silica-alumina, silica-magnesia, silica-zirconia, etc. Wholly or partially synthetic gel catalysts can be treated according to the process of the present invention, such catalysts generally containing from about 10 to about 30 or event up to 60 percent or more alumina. The catalysts may be only partially of synthetic material; for example, it may be made by the precipitation of silica-alumina and clay, such as kaolinite or halloysite. Other synthetic gel containing cracking catalysts which can be treated contain alumina added to a natural or synthetic silica-alumina base. The invention is particularly applicable to catalysts used for hydrocarbon conversion processes and which contain at least one synthetic crystalline material in an amount effective to promote the desired hydrocarbon conversion under hydrocarbon conversion conditions. Materials known as zeolites or molecular sieves are one preferred class of such synthetic crystalline materials. Useful zeolites include not only synthetic zeolites, but also natural occurring zeolites, the chemical makeup of which is modified or changed to enhance one or more of the catalystic properties of the naturally occurring zeolite.

Where the desired hydrocarbon conversion involves one or more of hydrocarbon cracking (preferably in the substantial absence of added free molecular hydrogen), disproportionation, isomerization, hydrocracking, reforming, dehydrocyclization, polymerization, alkylation, and dealkylation, synthetic crystalline materials, alumina silicates, SAPO, TAPO, MeAPO, AlPO, ZSM-Series, LZ-Z10, LZ-10, USY and the like may be employed. Certain of these synthetic crystalline materials are discussed in U.S. Pat. Nos. 4,310,440; 4,440,871;

4,500,651; 4,503,023; and 4,686,197, all of which are incorporated herein by reference.

As disclosed in U.S. Pat. No. 4,686,197 (the '197 Patent), sulfiding of the catalyst is generally performed after the catalyst has been regenerated or calcined to remove carbon deposits and, optionally, treatment of the regenerated catalyst with a molecular oxygen containing gas to increase vanadium removal. Typically, as pointed out in the '197 Patent, the regeneration and treatment of the regenerated catalyst with a molecular oxygen containing gas provides enhanced vanadium removal if those steps are performed before chlorination of the catalyst.

In conducting the sulfiding, the catalyst is contacted with at least one sulfiding agent in a sulfiding zone operated at an elevated temperature. Suitable sulfiding agents include elemental sulfur vapors or more conveniently volatile sulfides such as $H_2S$, $CS_2$, mercaptans, etc., $H_2S$ being a preferred sulfiding agent. The contact with the sulfiding agent can be performed at an elevated temperature, generally in the range of from about 500° F. to about 1650° F., preferably about 800° F. to about 1500° F. Other sulfiding conditions can include a partial pressure of the sulfiding agent of about 0.1 to about 30 atmospheres or more, preferably about 0.5 to about 25 atmospheres. Partial pressures of the sulfiding agent below atmosphere can be obtained either by using a partial vacuum or by diluting the sulfiding vapor with an inert gas such as nitrogen or hydrogen. The time of contact of the sulfiding agent with the catalyst may vary widely on the basis of the temperature and pressure chosen and other factors such as the amount of metal to be removed, type of catalyst, etc. The sulfiding step may run, for instance, from about 5 or 10 minutes up to about 20 hours or more depending on the sulfiding conditions and the severity of the catalyst poisoning. Pressures approximating 1 atmosphere or less are preferred in the sulfiding zone with a treatment time of from about at least 1 to about 2 hours, the time of course depending upon the manner of contacting of the catalyst, the sulfiding agent and the nature of the sulfiding step, i.e. batch or continuous, as well as the rate of diffusion within the catalyst. In the sulfiding step, as well known from the prior art, metals are converted to metal sulfur containing compounds, e.g. vanadium sulfur containing compounds which are more easily converted to the chloride form in subsequent chlorination.

Generally speaking, the sulfiding agent is introduced in an inert carrier gas such as nitrogen, argon, etc., the carrier gas being introduced in an amount sufficient to provide a fluidized bed within the sulfider.

In the improved process of the present invention, at least one hydrocarbon is introduced into the sulfiding zone together with the sulfiding agent. The hydrocarbon employed will have a minimum boiling point of about 300° F., preferably about 330° F., and will be at least partially vaporizable at the temperature employed in the sulfiding zone. Preferably, all of the hydrocarbon introduced into the sulfiding zone is vaporizable at the temperature in the sulfiding zone. While a pure hydrocarbon having the properties described above can be used, it is more convenient to introduce a mixture of hydrocarbons wherein at least some of the hydrocarbons in the mixture has the minimum boiling point of about 300° F. and are vaporizable at the temperature in the sulfiding zone. In particular, when a mixture of hydrocarbons is employed, it is preferred that the mixture have a boiling range of from about 300° F. to about 1000° F., preferably from about 330° F. to about 800° F. Suitable, non-limiting examples of hydrocarbons that can be employed include pure hydrocarbons such as decane, hendecane, dodecane, tridecane, tetradecane, oxdecane, eicosane, etc. In cases where the pure hydrocarbon is a solid at room temperature, it can be conveniently dissolved in a suitable hydrocarbon solvent and the solution introduced into the sulfider. Thus, for example, solutions of eicosane and decane can be conveniently employed. In addition to aliphatic hydrocarbons such as the alkanes mentioned above, aromatic hydrocarbons possessing the necessary properties described above for the hydrocarbons and which will not deleteriously effect the catalyst or undergo undesirable side reactions can also be employed. Non-limiting examples of suitable hydrocarbon mixtures include kerosine, diesel oil, gas oil, crude oil, vacuum distillates, heavy naphtha, etc. Especially preferred as a suitable hydrocarbon for introduction into the sulfiding zone is diesel oil which is relatively inexpensive and readily available.

The amount of hydrocarbon introduced into the sulfiding zone will generally be in an amount of at least about 0.3 percent by weight based on the total weight of the catalyst charged to the sulfider or sulfiding zone. More generally, the amount of hydrocarbon introduced into the sulfider will be in an amount of least about 0.3 up to about 5 percent by weight based on the weight of the catalyst being treated. While greater amounts of hydrocarbon can be introduced, generally no enhanced results are observed.

As noted above, it is common in catalyst demetallization processes to conduct both a sulfiding and a chlorinating step, the chlorinating step being designed to convert the metal-sulfur compounds into metallic chlorides which can be more easily removed from the catalyst than the corresponding metal-sulfur compounds, such removal being conventiently carried out by vaporization of the metallic chlorides and/or washing of the catalyst containing the metallic chlorides with suitable aqueous washes. Such a chlorination step is disclosed in U.S. Pat. No. 4,686,197, and is incorporated herein by reference.

The present invention is particularly suitable for demetallizing catalysts utilized in the catalytic cracking of reduced, or topped crude oils to more valuable products such as illustrated in U.S. Pats. Nos. 3,092,568 and 3,164,542, both of which are incorporated herein by reference. Similarly, the process of the present invention is applicable to the treatment of catalysts used to process shale oils, tar sands oils, coal oils and the like, where metal contamination of the cracking catalysts can occur.

To more fully illustrate the present invention, the following non-limiting examples are presented. In the examples which follow, all runs were conducted in a semi-commercial continuous flow demetallization unit comprising a cascaded arrangement of a calciner vessel, a sulfider vessel and a chlorination vessel. The catalyst was subjected to regeneration in the calciner to remove carbon deposits and heat the poisoned catalyst to the desired temperature for introduction into the sulfiding zone after which it was allowed to flow by gravity into the sulfider and then flow by gravity into the chlorinater. Flow rates of sulfiding agent and inert gas in the sulfider were sufficent to maintain fludized bed conditions. The catalyst was analyzed before being introduced into the demetallization process and after being treated in the demetallization process to determine the extent of vanadium removal. In all of the examples which follow, the following conditions were employed:
Catalyst Rate—10 tons per day (TPD)
Calciner Temperature—1400° F.
Chlorinator Temperature—650° F.
H₂S Flow Rate to Sulfider—500 pounds per day
N₂ Flow Rate to Sulfider—600 pounds per day
Cl1 Flow Rate to Chlorinator—750 pounds per day
Sulfider Pressure—Atmospheric
In all examples which follow, flow rates of of hydrogen sulfide, hydrocarbon and catalyst were maintained substantially constant. Diesel oil was used as the hydrocarbon in all cases.

EXAMPLE 1

In this example, the temperature in the sulfiding zone was maintained at 1450° F. Table 1 below shows the percent of vanadium and nickel removal for two differing feed rates of diesel as well as a comparative run with no added deisel.

TABLE 1

| Deisel Oil Feed | % Nickel Removal | % Vanadium Removal |
| --- | --- | --- |
| 0 | 85 | 30 |
| 5 gallons/day (gpd) (40 lb/day) | 85 | 37 |
| 10 gpd (80 lb/day) | 86 | 45 |

EXAMPLE 2

The procedure of Example 1 was followed with the exception that the sulfider temperature was maintained at 1400° F. The results showing nickel and vanadium removal are shown in Table 2 below.

TABLE 2

| Deisel Oil Feed | % Nickel Removal | % Vanadium Removal |
| --- | --- | --- |
| 0 | 75 | 17 |
| 5 gallons/day (gpd) (40 lb/day) | 76 | 23 |
| 10 gpd (80 lb/day) | 77 | 27 |
| 15 gpd (120 lb/day) | 77 | 27 |

As can be seen from the data above, the use of less than about 0.2 percent hydrocarbon (diesel oil) based on the total weight of catalyst charged produces no apparent improvement in vanadium removal. On the other hand, the use of an amount of hydrocarbon in excess of about 4 percent by weight based on the total weight of catalyst charged gives no apparent increased benefit. Accordingly, although amounts in excess of 4 percent of hydrocarbon based on the weight of catalyst can be employed without any deleterious effects, economics would dictate that an amount of from about 0.2 to about 5 percent by weight based on the weight of the catalyst charged be employed.

The foregoing description of the invention has been directed in primary part to a particular preferred embodiment in accordance with the requirements of the patent statutes and for purposes of explanation and illustration. It will be apparent, however, to those skilled in the art that many modifications and changes in the specifically described invention may be made without departing from the true scope and spirit of the invention. Therefore, the invention is not restricted to the preferred embodiments described, but covers all modifications which may fall within the scope of the following claims.

What is claimed is:

1. In a process for treating a catalyst which has been removed from a process used for the chemical conversion of hydrocarbons and containing at least vanadium as a metal poison, and wherein said metal poison containing catalyst is contacted with at least one sulfiding agent in a sulfiding zone at an elevated temperature to convert at least a portion of said vanadium to a vanadium sulfur containing compound and form a sulfided catalyst, the improvement comprising:
introducing at least one hydrocarbon into said sulfiding zone together with said sulfiding agent, said hydrocarbon having a minimum boiling point of about 300° F. and being at least partially vaporizable at the temperature in said sulfiding zone, said hydrocarbon being introduced into said sulfider in an amount effective to enhance subsequent vanadium removal from said catalyst, removing said sulfided catalyst from said sulfiding zone, chlorinating said sulfided catalyst and removing vanadium therefrom prior to returning said catalyst to said chemical conversion process.

2. The process of claim 1 wherein said hydrocarbon is added in an amount of at least about 0.3 percent by weight based on the weight of the catalyst being treated.

3. The process of claim 2 wherein said hydrocarbon is added in an amount of at least about 0.3 to about 5 percent by weight based on the weight of the catalyst being treated.

4. The process of claim 1 wherein a mixture of hydrocarbons is introduced into said sulfiding zone, said mixture of hydrocarbons having a boiling range of from about 330° to about 1000° F.

5. The process of claim 1 wherein a mixture of hydrocarbons is introduced into said sulfiding zone.

6. The process of claim 5 wherein said mixture of hydrocarbons is selected from the class consisting of kerosine, diesel oil, gas oil, crude oil, and mixtures thereof.

7. The process of claim 6 wherein said mixture of hydrocarbons comprises diesel oil.

8. The process of claim 1 wherein said sulfiding is carried out at a temperature of from about 500° F. to about 1650° F.

9. The process of claim 1 wherein said sulfiding agent comprises hydrogen sulfide.

10. The process of claim 1 wherein said catalyst comprises a synthetic zeolite capable of promoting hydrocarbon cracking.

* * * * *